(12) United States Patent
Hurewitz

(10) Patent No.: US 7,734,517 B2
(45) Date of Patent: Jun. 8, 2010

(54) SYSTEMS AND METHOD FOR DETERMINING THE COST OF A SECURITIES RESEARCH DEPARTMENT TO SERVICE A CLIENT OF THE DEPARTMENT

(75) Inventor: Barry Scott Hurewitz, New York, NY (US)

(73) Assignee: Morgan Stanley, New York, NY (US)

( * ) Notice: Subject to any disclaimer, the term of this patent is extended or adjusted under 35 U.S.C. 154(b) by 1452 days.

(21) Appl. No.: 10/857,526

(22) Filed: May 28, 2004

(65) Prior Publication Data

US 2006/0041456 A1    Feb. 23, 2006

(51) Int. Cl.
*G06Q 40/00* (2006.01)
*G07B 17/00* (2006.01)
*G07F 19/00* (2006.01)

(52) U.S. Cl. ............... 705/35; 705/30; 705/7
(58) Field of Classification Search ........ 705/1, 705/5, 11, 7, 32, 26, 28, 35, 30, 10; 707/E17.01, 707/10
See application file for complete search history.

(56) References Cited

U.S. PATENT DOCUMENTS

| | | | |
|---|---|---|---|
| 4,710,763 A | | 12/1987 | Franke et al. |
| 5,128,860 A | | 7/1992 | Chapman |
| 5,502,637 A | | 3/1996 | Beaulieu et al. |
| 5,630,070 A | | 5/1997 | Dietrich et al. |
| 5,822,410 A | * | 10/1998 | McCausland et al. .. 379/114.01 |
| 5,864,853 A | * | 1/1999 | Kimura et al. ......... 707/E17.01 |
| 5,913,201 A | | 6/1999 | Kocur |
| 5,940,843 A | | 8/1999 | Xucknovich et al. |
| 5,963,911 A | | 10/1999 | Walker et al. |
| 5,968,121 A | * | 10/1999 | Logan et al. ........... 707/E17.01 |
| 6,029,146 A | | 2/2000 | Hawkins et al. |
| 6,049,599 A | * | 4/2000 | McCausland et al. ....... 379/111 |
| 6,292,830 B1 | * | 9/2001 | Taylor et al. ................ 709/224 |
| 6,324,523 B1 | | 11/2001 | Killeen, Jr. et al. |
| 6,330,545 B1 | | 12/2001 | Suh |
| 6,374,227 B1 | | 4/2002 | Ye |

(Continued)

OTHER PUBLICATIONS

Anonymous "La Mased Credit Union Installs Harland's Touche Solution" May 2002, Bank Systems and Technology, V39N5 pp.18.*

(Continued)

*Primary Examiner*—Kelly Campen
(74) *Attorney, Agent, or Firm*—K&L Gates LLP

(57) ABSTRACT

In one technique, the time spent by each analyst of the department servicing the client over a specified period of time may be estimated. This value may then be adjusted based on the compensation of the analysis provider (or providers) servicing the client. Then, the compensation-weighted time of each analyst provider that serviced the client may be summed to thereby arrive at an estimate of the time and cost to service the client. In another technique, the standard cost per unit of different types of client touch that the equity research department produces is estimated. Then, the number and type of client touches a particular client receives over a given period of time (e.g., three months, one year, etc.) can be determined and multiplied by the standard cost per touch for the different touch types of to arrive at the total cost of servicing the client over the time period.

19 Claims, 8 Drawing Sheets

U.S. PATENT DOCUMENTS

| | | | |
|---|---|---|---|
| 6,381,744 B2 * | 4/2002 | Nanos et al. ................... 705/27 |
| 6,415,269 B1 | 7/2002 | Dinwoodie |
| 6,470,325 B1 | 10/2002 | Leemhuis |
| 6,507,825 B2 | 1/2003 | Suh |
| 6,519,571 B1 | 2/2003 | Guheen et al. |
| 6,671,674 B1 | 12/2003 | Anderson et al. |
| 6,681,211 B1 | 1/2004 | Gatto |
| 6,968,317 B1 | 11/2005 | Wallace et al. |
| 7,072,858 B1 | 7/2006 | Litzow et al. |
| 7,171,471 B1 | 1/2007 | Nair |
| 2002/0016752 A1 | 2/2002 | Suh |
| 2002/0035534 A1 | 3/2002 | Buist et al. |
| 2002/0055901 A1 | 5/2002 | Gianakouros et al. |
| 2002/0065758 A1 | 5/2002 | Henley |
| 2002/0111890 A1 | 8/2002 | Sloan et al. |
| 2002/0198815 A1 | 12/2002 | Greifeld et al. |
| 2003/0083926 A1 | 5/2003 | Semret et al. |
| 2003/0101124 A1 | 5/2003 | Semret et al. |
| 2003/0144932 A1 | 7/2003 | Martin et al. |
| 2003/0158807 A1 | 8/2003 | Takeshi |
| 2003/0225666 A1 | 12/2003 | Murtaugh et al. |
| 2003/0236721 A1 | 12/2003 | Plumer et al. |
| 2004/0010592 A1 | 1/2004 | Carver et al. |
| 2004/0088206 A1 | 5/2004 | Thompson et al. |
| 2004/0111308 A1 | 6/2004 | Yakov |
| 2004/0138998 A1 | 7/2004 | Lawrence |
| 2004/0181378 A1 | 9/2004 | Gilmore |
| 2005/0096950 A1 | 5/2005 | Caplan et al. |
| 2005/0097028 A1 | 5/2005 | Watanabe et al. |
| 2005/0125274 A1 | 6/2005 | Nastacio et al. |
| 2005/0172083 A1 | 8/2005 | Meiri |
| 2005/0216323 A1 | 9/2005 | Weild, IV |
| 2005/0240456 A1 | 10/2005 | Ward et al. |
| 2005/0246264 A1 | 11/2005 | Plunkett |
| 2005/0261922 A1 | 11/2005 | Marchisotto et al. |
| 2005/0261999 A1 | 11/2005 | Rowady, Jr. |
| 2005/0278240 A1 | 12/2005 | Delenda |
| 2006/0167703 A1 | 7/2006 | Yakov |
| 2008/0021805 A1 | 1/2008 | Hansen et al. |

OTHER PUBLICATIONS

Anonymous "Business Objects Lanunches Ithena, Inc; New Subsidiary Defines First E-Customer Intelligence Analytic Application" Feb. 9, 2000, Business Wire, 0006.*

U.S. Department of Energy. "Activity Based Costing," *Cost Estimating Guide*, Chap. 24. Mar. 1997.

Roztocki et al., "An Integrated Activity-Based Costing and Economic Value Added System As An Engineering Management Tool for Manufacturers," 1998 ASEM National Conference Proceedings, Virginia Beach, Oct. 1-3, 1998, pp. 77-84.

Granof et al., "Using Activity-Based Costing to Manage More Effectively," PriceWaterhouseCoopers Report, Jan. 2000.

"Code of Practice for Enhanced Commissions Processing," Thomson Financial esg, Oasys, Sep. 28, 2000, pp. 1-69.

Levitt, A., "Speech by SEC Chairman: Remarks before the 2000 Annual Meeting Securities Industry Association," US Securities and Exchange Commission, Boca Raton, Florida, Nov. 9, 2000.

Brennan et al., "Brokerage Commission Schedules," The Journal of Finance, vol. 48, No. 4, Sep. 1993, pp. 1379-1402.

Boni, L. et al., "Solving the Sell-Side Research Problem: Insights from Buy-Side Professionals," working paper, University of New Mexico, Aug. 8, 2002.

McCafferty, J., "Reform of sell-side research is creating a variety of new headaches for corporations," CFO Magazine, May 1, 2003.

Myner, "Institutional Investment in the United Kingdom: A Review," Mar. 6, 2001 ("The Myner's Report").

"2004 US Equity Research Industry Outlook—Table of Contents", Integrity Research Associates (3 pages).

Anonymous, "Sell-Side Story", Prweek (U.S. ed.), New York, Jul. 7, 2003, p. 17 (5 pages), vol. 6, Issue 26.

Boni, Leslie et al., "Wall Street Research: Will New Rules Change Its Usefulness?", Financial Analysts Journal, May/Jun. 2003 (7 pages), vol. 59, Issue 3, ABI/INFORM Global.

Business Editors/High-Tech Writers, "Independent Research Group Builds Equity Research Team", Business Wire, New York, Mar. 13, 2003, p. 1 (5 pages).

Chapman, P., "Keeping a Score for Traders: A Database That Keeps Track of Customer Business", Traders Magazine, New York, Dec. 1, 2003, p. 1 (3 pages).

Chen, Z., "Buy-Side and Sell-Side: The Industrial Organization of Information Production in the Securities Industry", University of Pennsylvania—The Wharton School, Mar. 2004, pp. 1-64.

"Facing the Charges for Research: The Way Fund Managers Bill Their Clients Needs Reform: [London 1st Edition]", Financial Times, London (UK), Oct. 13, 2003, p. 20 (3 pages).

"The Future of Equity Research: Where Will the Investment Community Look?", PR Newswire, New York, Feb. 4, 2004, p. (2 pages).

"National Express Group PLC Analyst and Investor Seminar": May 7, 2004, p. 1.

"An Interview with Mark Coker, Founder of Best Calls", 2000, 4 pages.

"Analyst Meeting", Dell Inc., Austin, Texas, Apr. 8, 2004, 55 pages.

"International Managers Feel Pinch of Sellside's Cost-Cutting Moves", Fund Action, New York, Jun. 30, 2003, p. 1 (2 pages).

McCafferty, J., "Reform of Sell-Side Research is Creating a Variety of New Headaches for Corporations," CFO Magazine, May 1, 2003.

Mehta, N., "Sellside Research Must Try Harder: Rocked by Scandals, Institutional Sellside Research Will Never be the Same", Traders agazine, New York, Dec. 1, 2003, p. 1 (6 pages).

Krantz, M., "Research for Individuals Can Cost a Bundle", USA Today, Dec. 2, 2002 (3 pages), accessed May 14, 2008, 3:51 PM from http://www.usatoday.com/money/industries/brokerage/2002-11-27-resea . . . .

Munk, C. Winokur, "Analysts' Roles Evolve with Incentives", Wall Street Journal (Eastern Edition), New York, May 21, 2003, p. 1 (4 pages).

Chapman, P., "Rating Sellside Services: Software Made for Buyside Spendthrifts", Traders Magazine, New York, May 1, 2004, p. 1 (3 pages).

Sec-Rel, Sec-Docket 79 Sec-Docket 2540-113, "United States of America Before the Securities and Exchange Commission", Release No. ID-225, Administrative Proceeding File No. 3-10607, Mar. 19, 2003 (13 pages).

"Sell-Side Analysts Heading to the Buy Side", Real Estate Finance and Investment, New York, Nov. 3, 2003, p. 1 (2 pages).

Sisk, M., "The Best of the Buy Side—II Magazine Platinum", Institutional Investor, (International Edition), New York, Jun. 2003, p. 1 (6 pages).

Stock, H., "Most Buy Siders Use Sell-Side Reports for Tips, Despite Conflicts", Investor Relations Business, New York, May 12, 2003, p. 1 (4 pages).

"Eliot Spitzer on His Fund Blitzkrieg", Business Week (Online), New York, Sep. 18, 2003, p. 1 (3 pages).

"The October Revolution on Wall Street: Strategies for adapting to the changing research landscape," Coffin Communications Group, Jun. 2003.

Boni, et al., "Wall Street's Credibility Problem: Misaligned Incentives and Dubious Fixes?," 5th Annual Brookings-Wharton Conference on the Future of Securities Markets, Brookings-Wharton Papers on Financial Services, 2002.

Non-Final Office Action mailed Mar. 19, 2008 for U.S. Appl. No. 10/856,442.

Non-Final Office Action mailed Dec. 11, 2008 for U.S. Appl. No. 10/856,442.

Interview Summary mailed Mar. 17, 2009 for U.S. Appl. No. 10/856,442.

Non-Final Office Action mailed May 6, 2008 for U.S. Appl. No. 10/857,400.

Interview Summary mailed Jul. 14, 2008 for U.S. Appl. No. 10/857,400.

Non-Final Office Action mailed Dec. 9, 2008 for U.S. Appl. No. 10/857,400.

Interview Summary mailed Apr. 2, 2009 for U.S. Appl. No. 10/857,400.
Non-Final Office Action mailed Jan. 30, 2008 for U.S. Appl. No. 10/939,087.
Interview Summary mailed Apr. 11, 2008 for U.S. Appl. No. 10/939,087.
Interview Summary mailed May 16, 2008 for U.S. Appl. No. 10/939,087.
Non-Final Office Action mailed Sep. 17, 2008 for U.S. Appl. No. 10/939,087.
U.S. Appl. No. 10/856,442, filed May 28, 2004.
U.S. Appl. No. 10/857,400, filed May 28, 2004.
U.S. Appl. No. 10/939,087, filed Sep. 10, 2004.
U.S. Appl. No. 11/450,994, filed Jun. 12, 2006.
Mehta, N. "Sellside Research Must Try Harder: Rocked by Scandals, Institutional Sellside Research Will Never by the Same", Traders Magazine, New York, Dec. 1, 2003, p. 1 (6 pages).
Final Office Action mailed Aug. 4, 2009 for U.S. Appl. No. 10/856,442.
Final Office Action mailed Aug. 3, 2009 for U.S. Appl. No. 10/857,400.
Notice of Allowance mailed Jul. 9, 2009 for U.S. Appl. No. 10/939,087.

* cited by examiner

| Question 1 | |
|---|---|
| Please check the box below that best categorizes clients' use of your time over the last 12 months. | Client Usage of Research<br>• *Heavy* users of your time: client contact at least once every 2 weeks<br>• *Medium* users of your time: client contact at least once every 6 weeks<br>• *Light* users of your time: client contact less than once every 6 weeks |

| Clients | Heavy | Medium | Light | None |
|---|---|---|---|---|
| Client 1 | | | | |
| Client 2 | | | | |
| Client 3 | | | | |
| Client 4 | | | | |
| Client 5 | | | | |
| Client 6 | | | | |
| Client 7 | | | | |
| Client 8 | | | | |
| Client 9 | | | | |
| . . . | | | | |
| Client n | | | | |

| Question 2 | |
|---|---|
| For clients listed above with whom you spent time over the last 12 months, how would you estimate your time is divided among the client-use categories? | Percentage (%) of time spent for each client-use category<br>(Must total 100%) |

| | Heavy | Medium | Light | None |
|---|---|---|---|---|
| | | | | |

| Question 3 | |
|---|---|
| Of the total time you spent with the equity research department's clients over the last 12 months, how would you estimate your time is spent with listed clients versus non-listed clients? | Percentage (%) of time spent with listed Client<br>(Must total 100%) |

| Listed Clients | Non-Listed Clients |
|---|---|
| | |

*FIG. 2*

| A. Over the last 12 months, how would you estimate your total work time is divided among the following activities? | | Percent (%) |
|---|---|---|
| 1 | Researching and creating research work product | |
| 2 | Directly serving clients | |
| 3 | Working with Research Sales department (excluding time spent with Research Sales spent directly with clients) | |
| 4 | Serving other divisions: Division 1 | |
| 5 | Serving other divisions: Division 2 | |
| 6 | Serving other divisions: Division 3 | |
| 7 | Serving other divisions: Division 4 | |
| | Total Time Spent (must equal 100%) | |
| B. Of the total time you spent researching and creating research work product (A1) over the last 12 months, how would you estimate your time is divided among the following activities? | | Percent (%) |
| 1 | Conducting proprietary research | |
| 2 | Conducting on-going research | |
| 3 | Creating/writing/editing finished documents and end-porduct for publishing | |
| 4 | Creating webcasts | |
| 5 | Working on models and valuations | |
| | Total Time Spent (must equal 100%) | |

*FIG. 4a*

| C. Of the total time you spent directly serving clients (A2) over the last 12 months, how would you estimate your time is divided among the following activities? | Percent (%) |
|---|---|
| 1 Talking to clients on the phone | |
| 2 Meeting with clients in either on-on-one or in small group settings (e.g., marketing meetings with clients) | |
| 3 Writing tailored emails to clients | |
| 4 Arranging and holding general conference calls for clients | |
| 5 Recording tailored voicemails for clients | |
| 6 Creating and recording blast voicemails | |
| 7 Arranging and attending Firm seminars or group events | |
| 8 Arranging and attending Firm conferences | |
| 9 Arranging and attending Firm client events | |
| 10 Arranging and attending non-deal/management road shows and meetings | |
| 11 Working on bespoke or custom research projects | |
| Total Time Spent (must equal 100%) | |
| D. Of the total time you spent in meetings with clients in either one-on-one or small group settings (C2) over the last 12 months, how would you estimate your time is divided among the following regions? | Percent (%) |
| 1 North America Day Trip | |
| 2 North America Overnight Trip | |
| 3 Europe | |
| 4 Asia | |
| 5 Japan | |
| 6 Other | |
| Total Time Spent (must equal 100%) | |

*FIG. 4b*

| | | |
|---|---|---|
| E. Of the total time you spent arranging and attending non-deal/management road shows and meetings over the last 12 months, how would you estimate your time is divided among the following regions? | | Percent (%) |
| 1 | North America Day Trip | |
| 2 | North America Overnight Trip | |
| 3 | Europe | |
| 4 | Asia | |
| 5 | Japan | |
| 6 | Other | |
| | Total Time Spent (must equal 100%) | |
| F. To the best of your ability, please estimate the total number of units associated with each activity and product you delivered over the last 12 months. | | Number |
| 1 | Total number of phone calls with clients (both inbound and outbound) | |
| 2 | Total number of clients visited in one-on-one and small group meetings over the last 12 months in each of the following regions: | |
| | North America Day Trip | Number of Clients visited in one-on-one meetings<br>Number of Clients visited in Small Group Meetings | |
| | North America Overnight Trip | Number of Clients visited in one-on-one meetings<br>Number of Clients visited in Small Group Meetings | |
| | Europe | Number of Clients visited in one-on-one meetings<br>Number of Clients visited in Small Group Meetings | |
| | Asia | Number of Clients visited in one-on-one meetings<br>Number of Clients visited in Small Group Meetings | |
| | Japan | Number of Clients visited in one-on-one meetings<br>Number of Clients visited in Small Group Meetings | |
| | Other | Number of Clients visited in one-on-one meetings<br>Number of Clients visited in Small Group Meetings | |
| 3 | Total number of tailored emails sent to clients | |
| 4 | Total number of tailored voicemails sent to clients | |
| 5 | Total number of blast emails sent to clients (e.g., 4 blast emails sent to 2,000 clients = 8,000 units) | |

*FIG. 4c*

| | | |
|---|---|---|
| 6 | For teams with more than one analyst, indicate the other analysts who jointly distribute with this blast email list: | |
| | Other Analyst 1 | |
| | Other Analyst 2 | |
| | Other Analyst 3 | |
| 7 | Total number of blast voicemail units sent to clients | |
| 8 | Total number of client attendees at your conference calls over the last 12 months | |
| 9 | Total number of client attendees to your seminars and group events over the last 12 months | |
| 10 | Total number of client attendees to your client events | |
| 11 | Total number of client attendees to your non-deal/management road shows and meetings over the last 12 months in each of the following regions: | |
| | North America Day Trip | Number of Clients visited in one-on-one meetings<br>Number of Clients visited in Small Group Meetings |
| | North America Overnight Trip | Number of Clients visited in one-on-one meetings<br>Number of Clients visited in Small Group Meetings |
| | Europe | Number of Clients visited in one-on-one meetings<br>Number of Clients visited in Small Group Meetings |
| | Asia | Number of Clients visited in one-on-one meetings<br>Number of Clients visited in Small Group Meetings |
| | Japan | Number of Clients visited in one-on-one meetings<br>Number of Clients visited in Small Group Meetings |
| | Other | Number of Clients visited in one-on-one meetings<br>Number of Clients visited in Small Group Meetings |

SYSTEMS AND METHOD FOR DETERMINING THE COST OF A SECURITIES RESEARCH DEPARTMENT TO SERVICE A CLIENT OF THE DEPARTMENT

BACKGROUND

The present invention generally concerns systems and methods for determining the cost of a securities research department to service a client of the department.

In the equities research industry, an equity research department generates intellectual property (research) that is provided or shared with a number of different parties. For example, the IP may be provided to portfolio managers of so-called "buy-side firms," i.e., institutional investors such as mutual funds, hedge funds, pension funds, etc. Also, the IP may be shared with, for example, the CEOs and CFOs of corporate clients. In addition, where the equities department is a department of a large brokerage or investment house, the IP may be shared with other constituents of the firm, such as traders, analysts, investment bankers, etc. Because the research is distributed to so many different parties, it is difficult to match budget items of the equity research department (which are mostly fixed costs) to revenues of the department.

Further complicating the ability to allocate costs of an equity research department to clients or other consumers of the equity research is the fact that the IP is distributed and consumed through many different channels. For example, the work product produced by an equity research department may comprise written publications (electronic or hardcopy), tailored or blast emails and voicemails, one-to-one meetings, conferences, seminars, corporate events, etc. The distribution and consumption channels for these various forms of work product vary. Therefore, it is difficult to track the production of these various forms of work product, as well as to track consumption of the work product. Accordingly, there exists a need for a technique by which an equity research department can track or determine the costs of servicing a client of the firm.

SUMMARY

Embodiments of the present invention are generally directed to two different techniques for determining the cost of an equity research department to service a client of the department.

Technique 1: The first technique generally includes estimating the time spent by each analyst of the department servicing the client over a specified period of time. The time spent servicing the client may then be adjusted based on the compensation of the analysis provider (or providers) servicing the client. Then, the compensation-weighted time of each analyst provider that serviced the client may be summed to thereby arrive at an estimate of the time and cost to service the client.

According to various implementations, the estimate of the time spent by the analysts to service the client may be estimated based on results of a survey taken by the analysts. The survey may ask the analysts to (i) estimate time spent collectively servicing a number of listed clients of the department and the time spent collectively servicing non-listed clients of the department over the specified period of time; (ii) categorize the listed clients based on the client's consumption of the analyst's time into one of a number of client-use categories; and (iii) estimate the time spent by the analyst collectively servicing the listed clients for each client-use category over the specified period of time.

Technique 2: In the second technique, the standard cost per unit of the different types of client touch that the equity research department produces is estimated. The client touch types may include, for example, phone calls with a client, one-to-one or small group meetings with a client, tailored emails or voicemails sent to a client, blast emails or voicemails sent to a client, conferences or conference calls attended by a client, published documents (hardcopy or electronic) produced for client consumption, etc. Then, the number and type of client touches a particular client receives over a given period of time (e.g., three months, one year, etc.) can be determined and multiplied by the standard cost per touch for the different touch types to arrive at the total cost of servicing the client over the time period.

The process of estimating the cost per client touch may include the step of estimating the number of units of client touch types produced by the department over a period of time. Next, the costs of support resources of the department over the period of time are allocated to the client touch types. Costs of support resources that are directly related to a particular client touch are allocated to that touch. Support costs that cannot be directly related to a particular type of client touch type can be spread across all of the client touch types, such as on a pro rata basis.

Also, time spent by analysis providers of the department over the period of time performing various activities is determined. This may be accomplished by use of a survey and/or by using various touch-capture systems (e.g., phone logs, electronic mailing labels, calendar logs, conference tracking systems, email meters, etc.). The cost of the time spent by the analysis providers performing activities related to a particular client touch type is allocated to the particular client touch type. The cost of research time spent by the analysis providers over the period of time may be spread across all of the client touch types. In that way, the cost of time spent by the analysis providers performing research (e.g., conducting research and writing/editing research work product) is effectively treated as a research and development (R&D) expense of the department. Then, the cost per unit of the client touch types can be estimated by, for each client touch type, dividing the sum of the costs for the client touch type by number of units of the client touch type to generate a standard cost per unit for the client touch types. Finally, costs may be allocated to the clients based on their consumption of client touches and the corresponding standard cost per unit for the client touch type consumed.

DESCRIPTION OF THE FIGURES

Embodiments of the present invention will be described by way of example in conjunction with the following figures, wherein

FIG. 2 illustrates a survey to be used in the process of FIG. 1 according to various embodiments of the present invention;

FIGS. 4a-4d illustrate a survey to be used in the processes of FIGS. 3a and 3b according to various embodiments of the present invention.

DESCRIPTION

Figure 1:
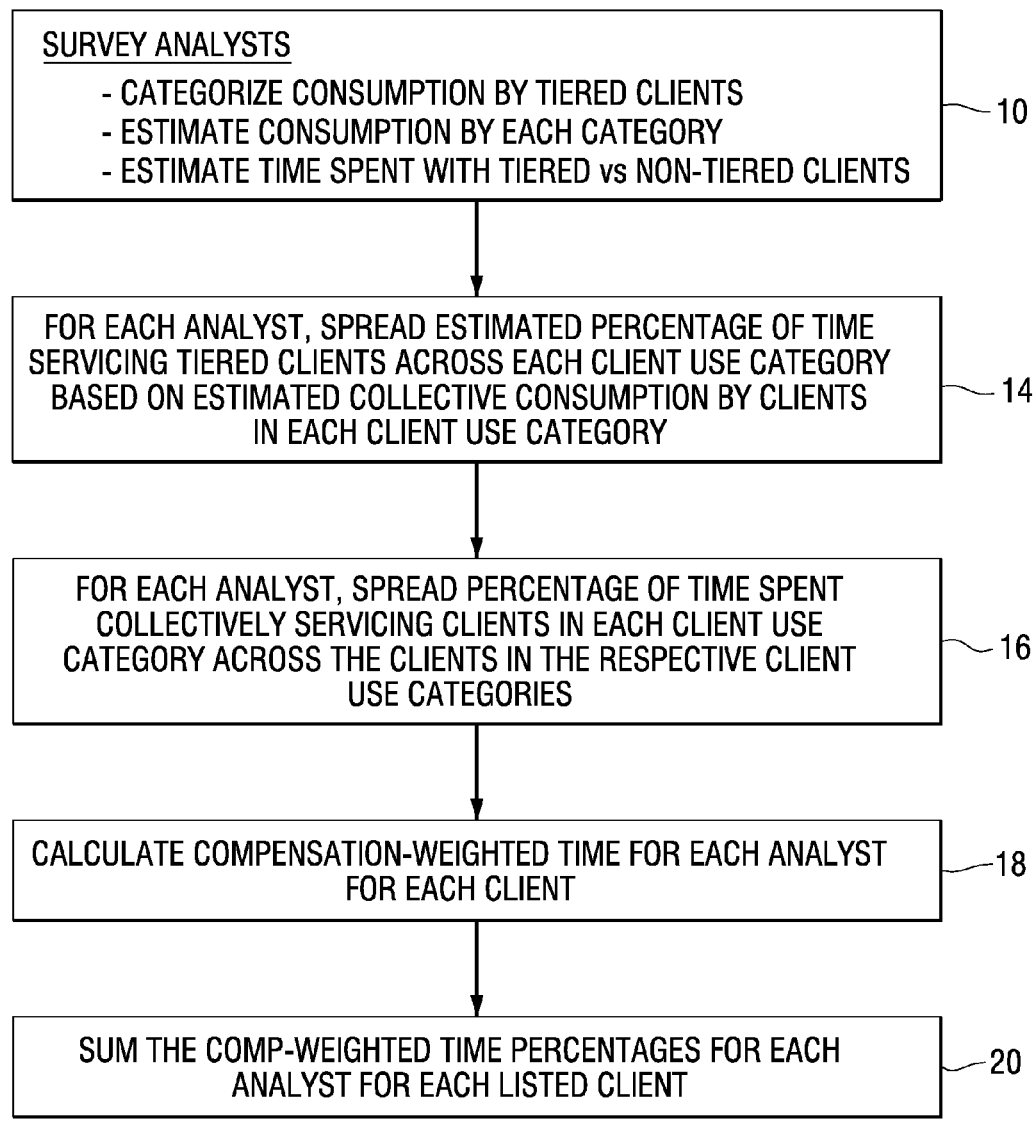
FIG. 1 is a diagram of a process according to various embodiments of the present invention.

FIG. 1 is a flowchart according to various embodiments of the present invention of a process for estimating the total time spent by analysts and/or analyst teams of an equity research department (or "firm") servicing particular buy-side clients and the cost of servicing the clients based on the clients' consumption of the analysts' time. The process starts at step 10, where analysts (preferably every analyst) of the equity research department complete a survey regarding the amount of time they spent servicing the department's clients. A sample survey 12 is shown in FIG. 2. The analysts may complete the survey on-line, such as through an internal web-based application, for example, or they may complete hard copies of the survey by hand.

As can been seen in FIG. 2, the survey 12 may first ask the analysts to categorize the consumption of their time for a number of the firm's clients over a particular time period (such as the preceding twelve months, for example). The clients listed in the survey may correspond to the first or top tier(s), or top n number (e.g., 150, 200, 250, etc.) of the firm's clients, in terms of, for example, revenue or profitability to the firm. The top tier(s) or top n number of clients may collectively account for certain percentage of the firm's revenues.

Any number of client-use categories to categorize the clients' consumption of the analysts' time may be used in the survey. In the illustrated example, four client-use categories are used: Heavy, Medium, Light and None (or immaterial). Further, the survey may provide the analysts with guidance as to what constitutes "Heavy" use of their time, "Medium" use, etc. For example, a client may be considered a "Heavy" user of an analyst's time if the analyst has contact with the client at least once every two weeks. A "contact" with a client may include, for example, an in-person conversation, a telephone call or teleconference, tailored e-mails and tailored voice-mails, etc. A client may be considered a "Medium" user of an analyst's time if the analyst has contact with the client at least once every six weeks. A client may be considered a "Light" user of an analyst's time if the analyst has contact with the client less than every six weeks. A client may be considered an immaterial or non-user of the analyst's time if the analyst almost never has contact with the client. In other embodiments, different numbers of categories and/or different definitions of what constitutes a particular client-use category may be used.

The clients may be listed in the survey in a manner that does not bias or tends to minimize bias in the survey results. For example, the clients may be listed alphabetically. Also, for an on-line survey, the analyst may be required to categorize every one of the listed clients. If an analyst fails to categorize one or more clients, the on-line survey may prohibit the analyst from proceeding to the next question or successfully submitting the survey.

The survey 12 may further ask the analyst to estimate how much of his/her time spent servicing the listed (or tiered) clients was divided among the client's categorized according to the various client-use categories. For example, in the sample survey of FIG. 2, the survey 12 may require the analyst to estimate how much of his/her time spent servicing the listed n clients was divided among Heavy users, Medium users and Light users. The survey may require, for example, that the sum for the Heavy, Medium and Light users equals 100%. Immaterial users may not be considered in this step, as their consumption of the analyst's time may be assumed to be insignificant.

In addition, the survey 12 may ask the analyst to estimate how much of his/her time was spent with the listed clients (e.g., the top n clients) versus non-listed clients. Again, the survey may require, for example, that the sum of the responses equals 100%.

Returning to the flowchart of FIG. 1, after the analysts have completed the survey, the results are compiled and, at step 14, for each analyst, the estimated percentage of time spent by the analyst with listed clients (as opposed to time spent servicing non-listed clients) is spread across each client use category based on the estimated collective consumption of the analyst's time of the clients in each client-use category. For example, suppose analyst A estimates her total client time as follows:

80% of time spent with listed clients and 20% spent with non-listed clients;

Of time spent with listed clients, 60% with Heavy users, 25% with Medium users and 15% with Light users; and Thus, in this example, Analyst A spent 48% of her time with Heavy users (computed as 80% times 60%), 20% of her time with Medium users (computed as 80% times 25%), and 12% of her time with Light users (computed as 80% times 15%).

Next, at step 16, for each analyst, the percentage of time spent by the analyst collectively servicing the clients in each client use category is spread across each client in the respective client-use categories. Thus, for instance, assuming Analyst A categorized fifty (50) clients as Heavy users in the survey, seventy five (75) as Medium users, and one hundred fifty (105) as Light users, this results in an estimate of:

0.96% of Analyst A's time spent with each Heavy user (computed as 48% divided by 50);

0.27% of Analyst A's time spent with each Medium user (computed as 20% divided by 75); and 0.08% of Analyst A's time spent with each Light user (computed as 12% divided by 150).

At step 18, according to various embodiments, a weighted adjustment of analyst time is calculated for each client. The weighting, for example, may be based on the compensation of the analyst. In order to perform this step, for example, the percentage of compensation that each analyst comprises of the total compensation pool for all analysts may be calculated. Then, for each analyst, the estimated time that the analyst spends with each client may be multiplied by the analyst's compensation percentage. For example, assume Analyst A's compensation makes up 2% of the compensation of all analysts. Thus, the comp-weighted adjustment of Analyst A's time may be calculated as follows:

multiply the estimated time for clients in Analyst A's Heavy use category (i.e., 0.96%) by 2% to arrive at a comp-weighted time percentage for Analyst A of 0.0192% for Heavy users;

multiply the estimated time for clients in Analyst A's Medium use category (i.e., 0.26%) by 2% to arrive at a comp-weighted time percentage for Analyst A of 0.0052% for Medium users; and multiply the estimated time for clients in Analyst A's Light use category (i.e., 0.08%) by 2% to arrive at a comp-weighted time percentage for Analyst A of 0.0016% for Light users.

Then, at step 20, the comp-weighted time percentages for each analyst for each listed client may be summed to determine a comp-weighted consumption percentage for each listed client. As an example, assume Client 1 was rated a Heavy user by p number of analysts, a Medium user by q number of analysts, and a Light user by r number of analysts. Further, assume that the sum of the comp-weighted adjusted time percentages for the p analysts who categorized Client 1 as Heavy was 1.2%, the sum for the q analysts who categorized Client 1 as Medium may be 0.4%, and the sum for the r analysts who categorized Client 1 as Light may be 0.15%. These percentages are summed to arrive at a comp-weighted consumption percentage for Client 1 of 1.75%. This may be done for each of the n clients. In this way, an estimate may be determined of how much of the department's analysts' time a particular client consumed, adjusted to compensate for the compensation of the respective analysts.

Figure 3A:
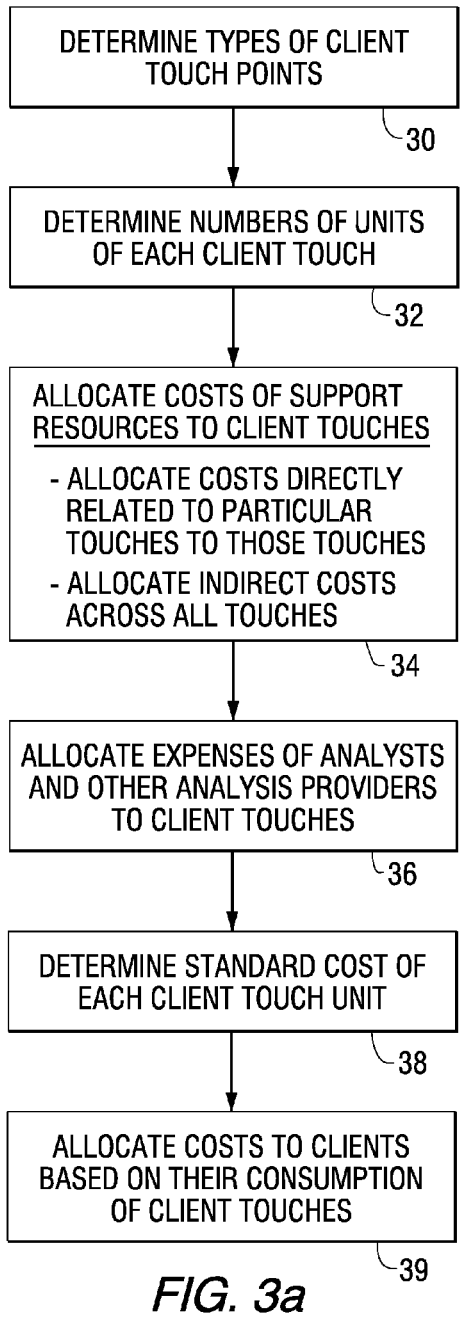
FIGS. 3a and 3b are diagrams of processes according to other embodiments of the present invention.

FIG. 3*a* is a flowchart illustrating the second technique according to various other embodiments of the present invention. The second technique allocates the costs of the equity research department to units produced by the department in order to determine a standard cost per unit. The units involved may be, for example, client touches (or client touch points), i.e., the ways in which an equity research department communicates or otherwise services its clients. The process may start at step 30 where the types of client touch points are determined. For an equity research department, client touch points may include both scaleable touches (deliverable to numerous clients at once) and non-scaleable touches (deliverable to one or only a few clients at a time). Scaleable touches may include, for example, blast voice mails, conference calls, live conferences or other live events, published documents (hardcopy or electronic), web casts and blast e-mail messages. Non-scaleable touches may include, for example, analyst phone calls, one-to-one or small group meetings, tailored e-mail messages, tailored voice mail messages, management meetings, etc.

Next, at step 32, the number of units of each client touch type produced over a given time frame (e.g., per year, per quarter, etc.) is determined or estimated. The number of units may be determined by any available and/or practicable means. For example, a computerized system, as described in more detail below in connection with FIG. 6, may track the number of client touches produced. The system may include telephone-tracking systems to track phone calls (both inbound and outbound) to clients. The telephone tracking system may track the number of calls, the parties, and/or the length of each call. Also, the client touch tracking system may include teleconferencing tracking services to track the number of and the participants in telephone conferences, as well as the length of the teleconferences. Also, email systems may be used to track the number of emails sent to clients (e.g., based on domain name extension). Further, publishing departments and/or research aggregation services may be used to track the number of hardcopy and/or electronic publications. In addition or in the alternative, surveys of analysts and other analyst providers may be used to estimate the number of units of each client touch type. Such a survey is described in more detail below. Other analysis providers for an equity research department, besides the analysts themselves, may include strategists, research associates, economists and accountants, for example.

Next, at step 34, the costs of support resources are allocated to client touches. Support resources may include management and other indirect costs. Support resources may also include any other costs besides the costs of the analysts' time, such as insurance, energy, rent, telephone, postage, printing, etc. The costs of support services directly related or identifiable to particular client touches may be directly allocated to those touches. That is, whenever possible support costs that can be directly identifiable with a particular type of touch are preferably directly allocated to that touch category. For example, the costs of a publishing division used for publishing hardcopy documents may be specifically allocated to hardcopy documents. Similarly, telephone costs may be directly allocated to telephone calls and/or voicemails, for example, and so on.

The costs of support resources that cannot be directly linked to client touches (e.g., indirect costs) may be spread across all client touch types. These costs may be spread evenly across all of the client touch types or may be spread pro rata, for example. That is, for example, the most numerous and/or most time-consuming client touches may be allocated more of the indirect and management costs than less numerous or less time-consuming client touches. For example, if published documents (either hardcopy or electronic) account for 80% of client touches, 80% of the indirect and management costs may be allocated to the cost of published documents. For other types of client touches, the allocation may be made based on time consumption; more time consuming client touches may be allocated a greater percentage of the indirect and management costs than less time consuming client touches.

Figure 3B:
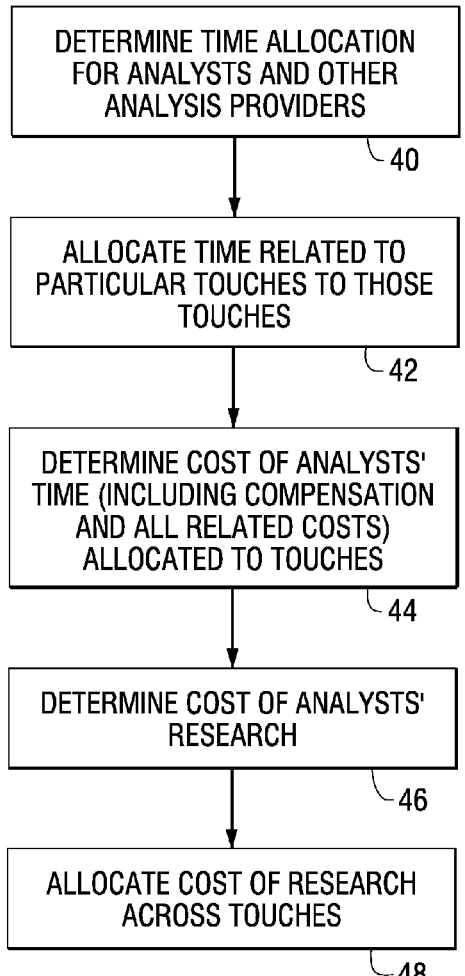

Next, at step 36, the expenses (including compensation) of the analysts and other analysis providers (e.g., strategists, research associates, economists, accountants) are allocated to the client touches. A process for this allocation, according to various embodiments, is shown in FIG. 3*b*. The process of FIG. 3*b* commences at step 40, where the time spent by the analysts and other analysis providers performing various activities tied to a touch category is determined or estimated. Any suitable technique for determining or tracking the time spent by analysts and other analysis providers in performing these activities may be used. For example, analysts and other analysis providers may record (electronically, for example) the time they spend on the various activities and those time entries may be compiled to determine the time spent on such activities.

According to another technique, a survey of the analysts and other analysis providers may be conducted to ascertain an estimate of how much of their time the analysts and other analysis providers spend performing the various activities that relate to a specific touch category. FIGS. 4*a*-4*d* illustrate a sample survey for estimating such time allocations, as well as estimating the number of units of client-touches. As can be seen in FIG. 4*a*, the survey may ask the analysts and other analysis providers to estimate what percentage of their time they spend performing various activities, such as, for example, researching and creating work product, directly serving clients, working with research sales, and serving other constituents (such as other divisions of the firm). Time spent serving other constituents may be allocated to those constituents and not allocated to a touch category. The questions of the survey may be designed so all work-related time of the analysts and other analysis providers can be considered to belong to at least one of the activities. Further, of the time that an analyst or other analysis provider spends researching and creating work product, the survey may ask what percentage of the time is spent, for example, conducting proprietary research, conducting on-going research, creating/writing/editing documents for publishing, creating web casts, and working on models and valuations.

As shown in FIG. 4*b*, the survey may further ask the analysts and other analysis providers to break down the time they spent directly servicing clients into several activities, including some client-touches. For example, the survey may ask the analysts what percentage of their time, of the time they spend directly servicing clients, is devoted to the activities of talking to clients on the phone, meeting with clients (e.g., either one-to-one or in small groups), writing tailored emails to clients, arranging and holding general conference calls with clients, recording tailored voicemails for clients, arranging and attending seminars or group events, arranging and attending conferences, arranging and attending client events, arranging and attending non-deal/management road shows and meetings, and working on bespoke or custom research projects.

In addition, as shown in FIG. 4b, the survey may ask the analysts to estimate how much time, of their time spent in meetings with clients in either one-on-one or small group settings over the specified time period (e.g., twelve months), was spent among in meetings in certain geographic regions. Similarly, as shown in FIG. 4c, the survey may ask the analysts to estimate how much time, of their time spent in arranging and attending non-deal/management road shows over the specified time period, was spent arranging and attending such meetings in certain geographic regions.

Further, as shown in FIGS. 4c and 4d, the survey may ask how many such meetings the analyst attended and how many clients attended such meetings. Additionally, as shown in FIGS. 4c and 4d, the survey may ask the analysts to estimate how many of certain types of client touches the analyst had, such as tailored emails and voice mails, the number and recipients of blast emails and voicemails, client attendees at conferences, seminars and other client events, etc. In this way, the number of such touches (including a client at a meeting) and the cost of such touches (related to the cost of the analyst's time for arranging and attending the meetings) can be determined. The survey may be as detailed as necessary to arrive at an estimate of the number of client touches and the expense of analysts and other analysis providers for such touches.

Based on this information, referring to FIG. 3b, at step 42, the analysts' and other analysis providers' time related to particular client touches can be allocated to those touches. For example, the time spent by analysts on the phone with clients can be allocated to the cost of client phone calls. Similarly, the time spent writing tailored emails can be allocated to the cost of providing tailored emails, and so on.

At step 44, the cost of such analyst time allocations for each client touch type may be determined or estimated. The cost may determined by multiplying a value related to the analysts' and other analysis providers' fully-loaded compensation and other expenses (e.g., insurance, office space, computer, support, insurance, etc.) times the time spent on the particular client touch type. According to various embodiments, an average compensation value for all analysts and analysis providers may be used. According to other variations, different average compensation values may be used for analysts, research associates, economists, strategists and accountants, respectively. In addition, according to still other implementations, the actual compensation of the individual analysts and analysis providers may be used. That is, for example, if Analyst A spent 5% of her time writing tailored emails to clients and has an associated cost of $S (including fully-loaded compensation plus expenses), the cost of Analyst A to write the tailored emails may be estimated as 0.05× (number of hours worked)×$S.

To track the costs or expenses associated with analysts, all costs related to the analysts are put in a cost code tied to the respective analyst or associated analyst team. The related costs may include, for example, benefits, office space, support, computer equipment, security, etc. These costs are allocated to each touch category based on the time that the analyst providers spend on activities related to the touch categories.

At step 46, the cost of time spent by analysts and other analysis providers doing research may be estimated. This may be done in order that the cost of research may be spread across the client touches, as explained further below. The cost of research may be determined by multiplying the time spent on research times an associated cost for the analysts' time (including full-loaded compensation and related expenses). The time spent on research may be estimated, for example, based on a survey or any other time tracking technique. For the analyst cost, as before, one or a number of average analyst costs may be used, or the actual costs of the analysts and other analysis providers may be used to determine the cost of research.

At step 48, the cost or expense of research may be allocated across the various client touches. The cost of research may be evenly allocated across all of the client-touch types, or it may be allocated on a pro rata basis. That is, for example, the most numerous and/or most time-consuming client touches may be allocated more of the research costs than less numerous or less time-consuming client touches. For example, if published documents (either hardcopy or electronic) account for 80% of client touches, 80% of the cost of research may be allocated to the cost of published documents. For other types of client touches, the allocation may be made based on time consumption; more time consuming client touches may be allocated a greater percentage of the research costs than less time consuming client touches.

Returning to FIG. 3a, at step 38, based on the cost information for each client touch type and the number of units of each client touch type, the cost of each client touch unit may be determined. The cost of each client touch type may be determined by adding the various line item costs for the particular client touch type (e.g., direct labor costs, support costs, etc.), as determined previously. In this way, for example, the average cost of an analyst (or other analysis provider) telephone call with a client may be calculated (on a per-call or per-minute basis), as may the average cost of a one-to-one or small group meeting (including a breakdown by geographic region), the average cost of tailored emails and voicemails, blast emails and voicemails, bespoke or custom research projects, conference calls, conferences, seminars and other client events, hardcopy and electronic documents, web casts, etc. Then, at step 39, the standard cost per client touch unit is allocated to clients based on the clients' consumption of touches.

Figure 5:
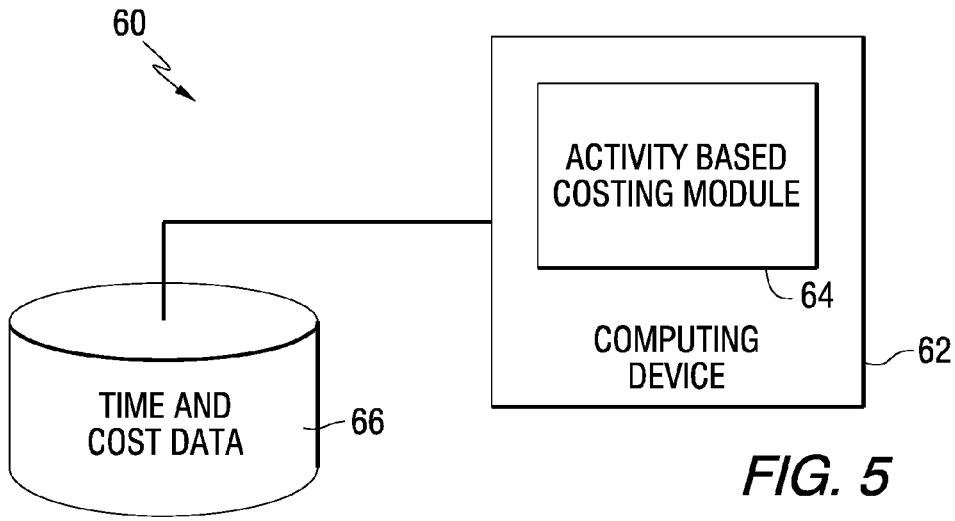
FIGS. 5 and 6 are diagrams of systems according to various embodiments of the present invention.

FIG. 5 is a diagram of a system 60 for computing the cost per unit for the client touches according to various embodiments of the present invention. The system 60 includes a computing device 62, which includes an activity based costing module 64. The activity based costing module 64 may be implemented as software code to be executed by a processor (not shown) of the computing device 62 using any suitable computer language, such as, for example, Java, C, C++, or Perl using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM. The computing device 62 may be implemented as one or a number of networked computing devices, such as personal computers, laptops, workstations, servers, etc.

A database 66 (or databases) may contain the acquired time and cost data as determined according to the techniques described above. The activity based costing module 64 may calculate the cost per unit of the respective client touches based on the data.

Figure 6:
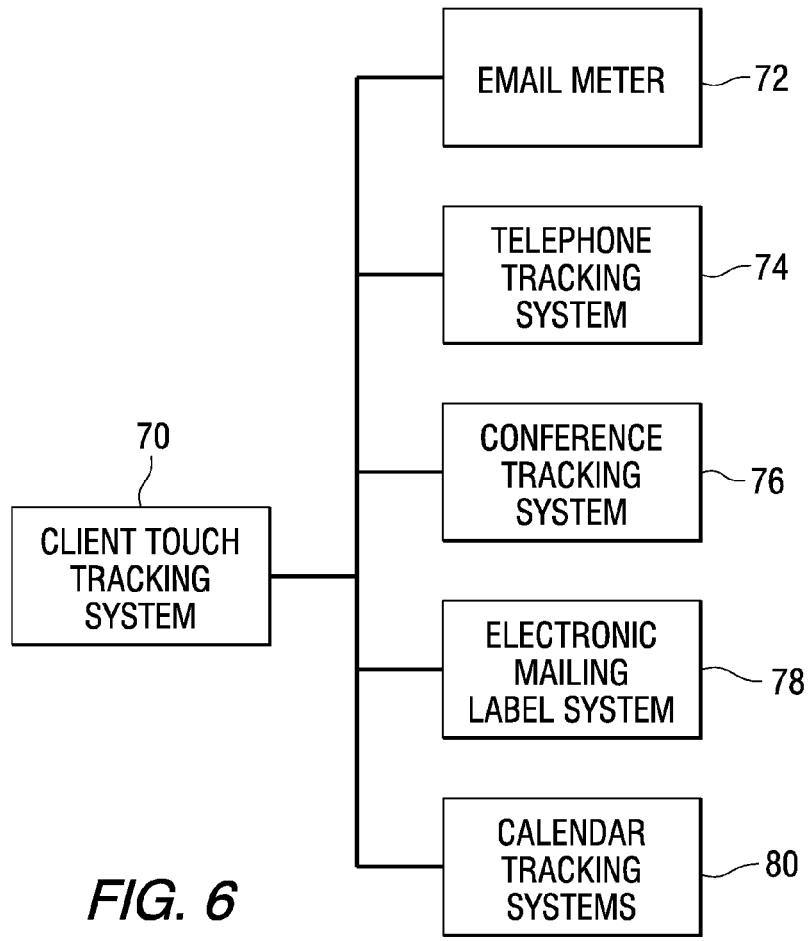

FIG. 6 is a diagram of a client touch tracking system 70 that may be used to track consumption by clients of client touches produced by the equity research department according to various embodiments. The client touch tracking system 70 may be a computerized tracking system that tracks (e.g., counts) the number and type of touches consumed by clients based on input from other systems. For example, the client tracking system 70 may be in communication with an email meter 72 that tracks email sent by the equity research department to clients. The email meter 72 may interface with the email system of the equity research department and, based on the domain name extension of the sent emails, determine which emails where sent to clients and by whom. If sent to a mass-mailing list, it may be assumed that the email was a blast email. If sent to one or a few parties, it may be assumed that the email was a tailored email. If the email was sent by the publishing department, it may be assumed that the email included an electronic research publication, for example.

Also, the tracking system 70 may be in communication with a telephone tracking system 74 that may track phone calls made and received by the analysis providers. The telephone tracking system 74 may track the calling parties and the length of the call. Based on the number of recipients, it may be determined whether the call was a blast voicemail or a tailored voicemail, for example. Similarly, a conference tracking system 76 may track telephone and/or videoconferences conducted by the analysis providers, including the participants, length and medium.

An electronic mailing label system 78 may track production of electronic mail labels. From this data, the number and recipients of hardcopy research publications may be determined. Also, a calendar tracking system 80 may track time entries of the analysis providers to determine, for example, time spent by the analysis providers performing research, attending road shows or conferences, etc. The data from these tracking systems may also be used in conjunction with survey data to help determine the number of client touches produced.

While several embodiments of the invention have been described, it should be apparent, however, that various modifications, alterations and adaptations to those embodiments may occur to persons skilled in the art with the attainment of some or all of the advantages of the present invention. For example, the steps described above in connection with processes of FIG. 1, 3a or 3b may be performed in various orders. It is therefore intended to cover all such modifications, alterations and adaptations without departing from the scope and spirit of the present invention as defined by the appended claims.

What is claimed is:

1. A computer-implemented method of computing the cost of a securities research department to service a plurality of clients of the department, comprising:
   receiving by one or more computer devices, survey data of a plurality of analysts of the research department, wherein the survey data comprises:
   (i) first data indicative of an analyst's categorization of a plurality of clients listed in a survey into one of a plurality of pre-determined client use categories, wherein each client-use category reflects the client's level of consumption of the analyst's time over a time period;
   (ii) second data indicative of the analyst's estimation of how a percentage of the analyst's time spent providing services to the clients was divided among each of the client-use categories over the time period;
   (iii) third data indicative of the analyst's estimation of a percentage of how the analyst's time was spent with the clients listed in the survey versus non-listed clients over the time period;
   calculating, by one or more of the computer devices, for each analyst and for each client-use category a first value indicating an estimated portion of the analyst's time spent on clients in the client-use category, wherein the first value is calculated by allocating a total portion of the analyst's time spent servicing clients in the client-use category pro rata over each client in the client-use category, and wherein calculating the first value comprises calculating the estimated portion based on the first data, second data and third data;
   calculating, by one or more of the computer devices, for each analyst and for each client-use category, a second value indicating a compensation-weighted portion of the analyst's time spent on clients in the client-use category, wherein calculating the second value comprises considering the first value and data indicative of the compensation of the analyst; and
   calculating, by one or more of the computer devices, for each listed client, a compensation-weighted time spent by the analyst servicing each client over the time period, wherein calculating the compensation-weighted time comprises summing, for each client, the second values corresponding to each analyst that serviced the client over the time period, and wherein the one or more computer devices comprise a processor and an operatively associated electronic storage device.

2. The method of claim 1, wherein calculating a compensation-weighted time for each analyst includes:
   calculating the data indicative of the compensation of the analyst considering a percentage of the total compensation pool that the analyst receives.

3. The method of claim 1, wherein the client-use categories include heavy users, medium users, light users and immaterial users.

4. The method of claim 1, further comprising the one or more computer devices electronically transmitting a survey to the plurality of analysts, wherein the survey lists the listed clients in alphabetical order.

5. The method of claim 4, wherein the survey is transmitted to the analysts on-line.

6. A method of computing the estimated cost per unit of client touches for a securities research department, the method comprising:
   computing by a computerized client touch tracking system, a plurality of first values, where each first value is indicative of a number of units of one or a plurality of client touch types produced by analysis providers in the department over a period of time, wherein the computing comprises:
   receiving, by the computerized client touch tracking system from an e-mail meter interfaced to an e-mail system of the securities research department data indicating analysis provider e-mails sent to clients;
   receiving by the computerized client touch tracking system from a telephone tracking system, data indicating analysis provider telephone calls to clients;
   receiving by the computerized client touch tracking system from an electronic mailing label system, data indicating electronic mail labels generated for analysis providers; and
   computing, by the computerized client touch tracking system, the plurality of first values based at least in part on the data from the e-mail meter, the telephone tracking system and the electronic mailing label system;
   computing, by one or more computer devices, a first allocation for each client touch type, wherein each first allocation is an allocation of support resource costs of the department over the period of time to the corresponding client touch types;
   computing, by the one or more computer devices, a second allocation for each client touch type, wherein each second allocation is an allocation of analysis provider costs of the department over the period of time to the corresponding client touch types;

determining, by the one or more computer devices, for each of the plurality of client touch types, a cost of per unit of the client touch type, wherein determining each cost per unit is based on an aggregation of the first allocation and the second allocation for the corresponding client touch type divided by the first value for the corresponding client touch type, whereby the one or more computer devices generate a standard cost per unit for the plurality of client touch types; and computing, by the one or more computer devices, for each of the plurality of clients, a cost of servicing the client over the time period based on the cost per unit for each client touch type associated with the client and the number of touches received over the time period by the client for each client touch type.

7. The method of claim 6, wherein the client touch types include at least one of:
   a phone call with a client;
   a one-to-one meeting with a client;
   a small group meeting including a client;
   a tailored email to a client;
   a tailored voicemail sent a client;
   a custom research project for the client;
   a blast voicemail sent by a client;
   a conference call attended by a client;
   a conference attended by a client;
   a seminar attended by a client;
   a published document received by a client;
   a blast email sent to a client; and
   a web cast sent to a client.

8. The method of claim 6, wherein the analysis providers include at least one of analysts, research associates, strategists, economists and accountants.

9. The method of claim 6, wherein computing the second allocation comprises:
   determining time spent by the analysis providers over the period of time performing various activities; and
   allocating the cost of the time spent by the analysis providers over the period of time performing tasks related to particular client touch types to the particular client touch types.

10. The method of claim 9, wherein determining the time spent by the analysis providers includes surveying the analysis providers regarding the time spent performing the various activities over the time period.

11. The method of claim 10, wherein determining the time spent by the analysis providers includes tracking the time spent by the analysis providers performing the various activities.

12. The method of claim 6, wherein computing the second allocation comprises evenly allocating the cost of research time spent by the analysis providers over the period of time to the one or more client touch types.

13. The method of claim 6, wherein computing the second allocation comprises allocating the cost of research time spent by the analysis providers over the period of time to the one or more client touch types on a pro rata basis.

14. The method of claim 6, wherein computing the first allocation comprises evenly allocating costs of support resources of the department over the period of time to the client touch types.

15. The method of claim 6, wherein computing the first allocation comprises allocating costs of support resources of the department over the period of time to the client touch types on a pro rata basis.

16. The method of claim 6, wherein the cost of support resources includes management expenses over the period of time.

17. The method of claim 6, wherein the cost of support resources includes indirect costs incurred over the period of time.

18. A system for determining the cost of an equity research department to service a plurality of clients of the department, the system comprising:
   a processor;
   a network device coupled to the processor and adapted to communicate via a communications network;
   a storage device in communication with the processor and storing instructions adapted to be executed by the processor to:
   receive survey data of a plurality of analysts of the research department, wherein the survey data comprises:
      (i) first data indicative of an analyst's categorization of a plurality of clients listed in a survey into one of a plurality of pre-determined client use categories, wherein each client-use category reflects the client's level of consumption of the analyst's time over a time period;
      (ii) second data indicative of the analyst's estimation of how a percentage of the analyst's time spent providing services to the clients was divided among each of the client-use categories over the time period;
      (iii) third data indicative of the analyst's estimation of how a percentage of the analyst's time was spent with the clients listed in the survey versus non-listed clients over the time period;
   calculate for each analyst and for each client-use category a first value indicating an estimated portion of the analyst's time spent on clients in the client-use category, wherein the first value is calculated by allocating a total portion of the analyst's time spent servicing clients in the client-use category pro rata over each client in the client-use category, and wherein calculating the first value comprises calculating the estimated portion based on the first data, second data and third data;
   calculating, by one or more of the computer devices, for each analyst and for each client-use category, a second value indicating a compensation-weighted portion of the analyst's time spent on clients in the client-use category, wherein calculating the second value comprises considering the first value and data indicative of the compensation of the analyst; and
   calculating, by one or more of the computer devices, for each listed client, a compensation-weighted time spent by the analyst servicing each client over the time period, wherein calculating the compensation-weighted time comprises summing, for each client, the second values corresponding to each analyst that serviced the client over the time period, and wherein the one or more computer devices comprise a processor and an operatively associated electronic storage device.

19. A system for estimating the cost per unit of client touches for an equity research department, the system comprising a computerized client touch tracking system comprising:
   a processor;
   a network device coupled to the processor and adapted to communicate via a communications network;

a storage device in communication with the processor and storing instructions adapted to be executed by the processor to:

compute a plurality of first values, where each first value is indicative of a number of units of one or a plurality of client touch types produced by analysis providers in the department over a period of time, wherein the computing comprises:

receiving from an e-mail meter interfaced to an e-mail system of the securities research department data indicating analysis provider e-mails sent to clients;

receiving by the computerized client touch tracking system from a telephone tracking system, data indicating analysis provider telephone calls to clients;

receiving by the computerized client touch tracking system from an electronic mailing label system, data indicating electronic mail labels generated for analysis providers; and computing the plurality of first values based at least in part on the data from the e-mail meter, the telephone tracking system and the electronic mailing label system;

compute a first allocation for each client touch type, wherein each first allocation is an allocation of support resource costs of the department over the period of time to the corresponding client touch types;

compute a second allocation for each client touch type, wherein each second allocation is an allocation of analysis provider costs of the department over the period of time to the corresponding client touch types;

determine for each of the plurality of client touch types, a cost of per unit of the client touch type, wherein determining each cost per unit is based on an aggregation of the first allocation and the second allocation for the corresponding client touch type divided by the first value for the corresponding client touch type, whereby the one or more computer devices generate a standard cost per unit for the plurality of client touch types; and compute for each of the plurality of clients, a cost of servicing the client over the time period based on the cost per unit for each client touch type associated with the client and the number of touches received over the time period by the client for each client touch type.

* * * * *